S. B. FULLER.
Gig-Saw.

No. 165,162. Patented July 6, 1875.

Witnesses.

Sylvester B. Fuller.
by his attorney.

UNITED STATES PATENT OFFICE.

SYLVESTER B. FULLER, OF LYNN, MASSACHUSETTS.

IMPROVEMENT IN JIG-SAWS.

Specification forming part of Letters Patent No. 165,162, dated July 6, 1875; application filed June 1, 1875.

*To all whom it may concern:*

Be it known that I, SYLVESTER B. FULLER, of Lynn, of the county of Essex and State of Massachusetts, have invented a new and useful Improvement in Jig-Saws; and do hereby declare the same to be fully described in the following specification and represented in the accompanying drawings, of which—

Figure 1:
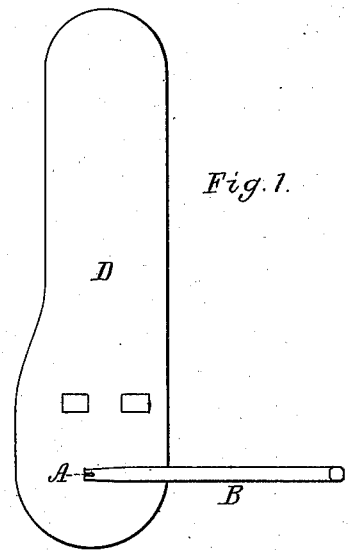
Figure 2:
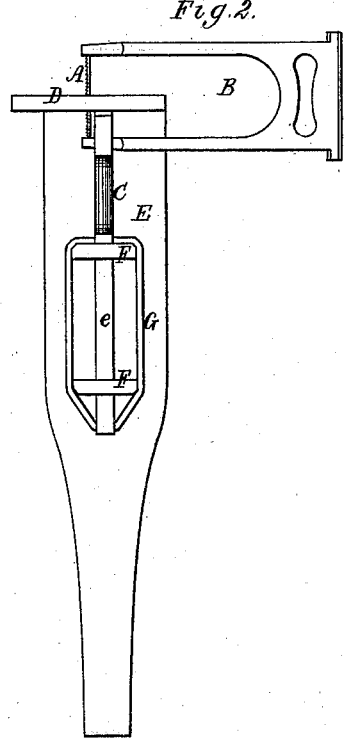
Figure 3:
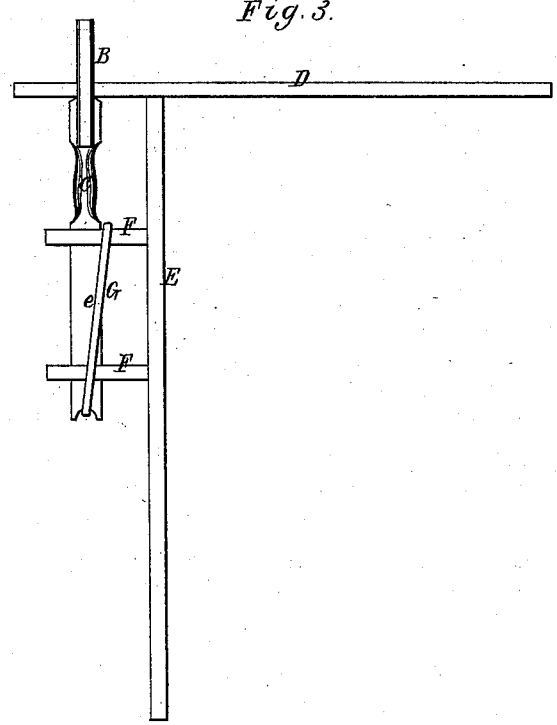

Figure 1 is a top view, Fig. 2 a front elevation, and Fig. 3 a side elevation, of a machine in accordance with my invention.

It is to be operated in part by one hand of an attendant, while he with the other hand properly holds and moves the work to the saw, the said saw being elevated by a spring applied to its handle.

In the drawings, A denotes a common short jig-saw fixed at its ends on or to the prongs of a furcated frame, B, formed as shown, and attached at its lower prong to a handle, C, provided with an extension or shank, e, as shown. The saw passes through a hole in a board or plate, D, arranged at right angles to another plate, E, and fixed to it at its upper end. From the plate E two ears or guides, F F, are projected, as represented, the saw-frame-handle shank e being arranged in holes in said ears, by which it is guided in its reciprocating movements, it being prismatic in form. At its foot the said handle-shank is notched to receive an india-rubber-ring spring, G, which goes around the two ears, and in the notch of the foot of the handle-extension, in manner as shown.

The machine so made may be applied to and fixed to a bench or table, the base-plate D being laid thereon, with the plate E against the edge of the table or bench top.

In using the machine, a person grasps the handle C, which is next to the saw-carrying frame B, and successfully pulls it down against the power of the spring, which he allows to operate to force the handle-shank handle and the saw and its frame upward after each depresssion thereof.

He has only to pull the saw-frame down to cause the saw to cut into the work laid on the plate D, the spring operating to effect the upward movement of such frame with the saw.

This little machine can be used to great advantage in sawing scroll or fret work, and can be afforded to a mechanic at a trifling sum in comparison to what a jig-saw machine to operate by power usually costs him. The rise of the handle is arrested by its top coming into contact with the plate D.

In the described jig or scroll sawing machine, I claim as my invention—

The handle C, and its guides F F, and operative spring G, arranged and combined with the saw-carrier B, and the supporting-frame D E, all substantially in manner and to operate as shown and described.

SYLVESTER B. FULLER.

Witnesses:
R. H. EDDY,
J. R. SNOW.